United States Patent [19]

Kattner et al.

[11] 4,124,853

[45] Nov. 7, 1978

[54] HYDRAULIC DAMPENING DEVICE IN AN INK SUPPLY SYSTEM OF AN INK OPERATED MOSAIC PRINTER UNIT

[75] Inventors: Erich Kattner; Wilfried Kindler, both of Munich, Germany

[73] Assignee: Siemens Aktiengesellschaft, Berlin & Munich, Germany

[21] Appl. No.: 726,736

[22] Filed: Sep. 27, 1976

[30] Foreign Application Priority Data

Sep. 29, 1975 [DE] Fed. Rep. of Germany ....... 2543397

[51] Int. Cl.[2] ........................ G01D 15/16; B41J 27/00

[52] U.S. Cl. ................................................ 346/140 R

[58] Field of Search .............................. 346/140 R, 75

[56] References Cited

U.S. PATENT DOCUMENTS

| | | | |
|---|---|---|---|
| 3,708,798 | 1/1973 | Hildenbrand | 346/140 R |
| 3,832,579 | 8/1974 | Arndt | 346/140 R X |
| 3,852,773 | 12/1974 | Sicking et al. | 346/140 R |
| 3,930,260 | 12/1975 | Sicking | 346/140 R |

*Primary Examiner*—Joseph W. Hartary

*Attorney, Agent, or Firm*—Hill, Gross, Simpson, Van Santen, Steadman, Chiara & Simpson

[57] ABSTRACT

A device for supplying ink to a mosaic printer unit having several printing ink jets provided in a printer head characterized by the device having a common distributor unit to supply ink to each of the printing ink jets attached on the printer head and having a cavity receiving the printing ink. To dampen hydraulic pressure fluctuations or vibrations in the ink received in the cavity, the cavity in the neighborhood of its highest point has an elastic wall member which may be either a diaphragm closing an opening in the cavity, or an elastic tube whose interior is in communication with the atmosphere.

1 Claim, 3 Drawing Figures

HYDRAULIC DAMPENING DEVICE IN AN INK SUPPLY SYSTEM OF AN INK OPERATED MOSAIC PRINTER UNIT

BACKGROUND OF THE INVENTION

1. Field of the Invention

The present invention is directed to an improved dampening device in a device for supplying ink by a common distributor unit to a plurality of printing ink jets provided in a printer head of a mosaic printer unit.

2. Prior Art

German Offenlegungsschrift No. 2,262,106, U.S. Pat. No. 3,708,798, discloses a tubular distributor arrangement which communicates with each printing ink jet of a piezoelectric operated printer head. To dampen incompressible hydraulic pressure waves or pressure fluctuations in the ink supply, the distributor arrangement is provided with a volume of air in the form of an included bubble of air which will be compressed and expanded in response to hydraulic pressure fluctuations in the ink supply.

This type of dampening arrangement which utilizes an included bubble of air had several drawbacks. For example, the volume of the air bubble can vary depending on the nature of the ink and the thermal conditions in the distributor arrangement. In addition, over a long period of time, the volume and the elastic characteristics of the air bubble will change due to the air being absorbed in the printing liquid. Due to the physical separation of the ink distributor arrangement from the printer head which is moving along a data carrier, additional pressure oscillations or fluctuations will occur. It is extremely difficult to compensate for these oscillations or fluctuations by using the known dampening device which comprises a bubble of air.

SUMMARY OF THE INVENTION

The present invention is directed to an improved device for supplying ink to a mosaic printer unit having several printing ink jets provided in a printer head. The improved device includes a distributor unit to supply ink to each of the printing ink jets which unit is subjected to the same forces as the associated printer head and the device includes an improved dampening means for dampening hydraulic vibrations or pressure fluctuations in the printing ink which dampening means has a precisely defined dampening characteristic that is independent of the temperature and the consistency of the printing liquid or ink being used. The dampening means is intended in particular to dampen the mechanical vibrations in the device for supplying ink, which vibrations occur in particular during intensive printing operations so that even under conditions of heavy impact by the overall printer unit, the individual printing jets do not caviate and air is not allowed to penetrate into the jets as a consequence of the resultant hydraulic pressure fluctuations or vibrations.

In accordance with the invention, these objects are achieved by the distributor unit being a common distributor unit that is attached to the printer head and has a cavity receiving the printing ink, said cavity in the neighborhood of its highest point being provided with an elastic wall member so that hydraulic pressure fluctuations or vibrations in the supply of ink in the cavity are dampened by movement of the elastic wall member. The elastic wall member may be a diaphragm which closes an opening in a solid wall of the distributor unit and, in particular, an advantageous embodiment of the elastic wall member comprises a hose whose interior communicates with the atmospheric air surrounding the distributor unit.

In accordance with the device of the present invention, severe mechanical shocks, which occur during the printing operation, can be advantageously dampened out or removed. The requisite dampening factor of the dampening means can be matched precisely to the characteristics of the printing ink jets and will not become altered over a long period of time or by the presence of thermal changes. In addition, changes in the atmospheric air pressure will have no effect upon the dampening characteristics of the elastic wall member.

Because of the fact that the distributor unit containing the dampening means is either integrated into the printer head or directly attached thereto, the distributor unit will experience the same mechanical loads as the printing jets. Consequently, the dampening device can be precisely matched to the printing ink jets and under conditions of heavy impact, no additional pressure oscillations or fluctuations will be produced by the connecting lines.

The dampening means, which comprises an elastic wall members, is arranged in the neighborhood of the highest point in the distributor unit. If it were to be located at a bottom portion of the unit, then in the event of a heavy impact on the part of the printer head, the liquid column or volume in the unit would move downward due to the elasticity of the elastic wall member and therefore, withdraw ink from the printing ink jets. Such a withdrawal of ink from the printing ink jets would cause an unwanted penetration of air through the discharge orifices of the jets and this phenomenon or condition would interfere with the printing operation.

DESCRIPTION OF THE PREFERRED EMBODIMENTS

Figure 1:
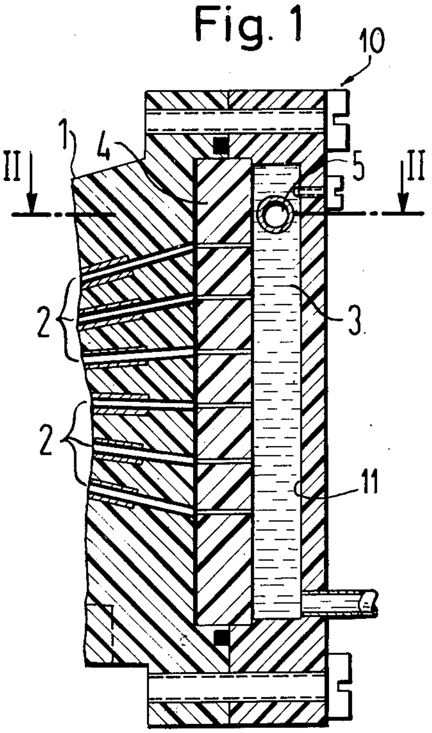
FIG. 1 is a partial cross section of the improved ink supply device of the present invention.

The principles of the present invention are particularly useful when incorporated in a device generally indicated at 10 for supplying ink to a mosaic printer unit having several piezoelectrically operated printing ink jets 2 combined in a printer head 1. As illustrated, the printer head 1 is a synthetic resin casting in which the printing ink jets 2 were cast in situ.

The device 10 includes a common distributor unit 3 which is attached directly onto the printer head 1 such as by threaded fasteners. Disposed between the common distributor unit 3 and the printer head 1 is a throttle plate 4 which, during a printing operation, functions to prevent any reaction that may occur in the printing ink jets 2 to be applied to a supply of ink contained in a cavity 11 of the distributor unit 3.

Figure 2:
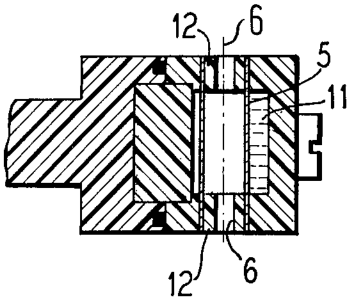
FIG. 2 is a partial cross section taken along lines II—II of FIG. 1.

In order to dampen hydraulic vibrations or pressure fluctuations within the supply of ink in the cavity 11, which pressure fluctuations or hydraulic vibrations are produced by mechanical shocks and similar disturbances, the cavity 11 of the distributor unit in the neighborhood of its highest point is provided with an elastic wall member which is illustrated as a silicon hose 5 that extends across the cavity 11. The interior of the hose 5, as best illustrated in FIG. 2, is in communication with the surrounding atmospheric air by air compensator bores 6 which are provided in members 12 that secure the hose 5 in the distributor unit 3. Through these air compensator bores 6, atmospheric pressure fluctuations are prevented from having any effect on the elastic characteristic of thesilicon hose 5.

Due to the small size of the ink column or volume in the cavity 11 and its resultant lower weight, the pressure fluctuations within the fluid system are extremely small; although these fluctuations can nevertheless affect the printing jets 2. By virtue of the fact that a dampening device, which has a precisely defined dampening characteristic is arranged in the ink supply system, it is possible to compensate for these small hydraulic vibrations or pressure fluctuations.

Figure 3:
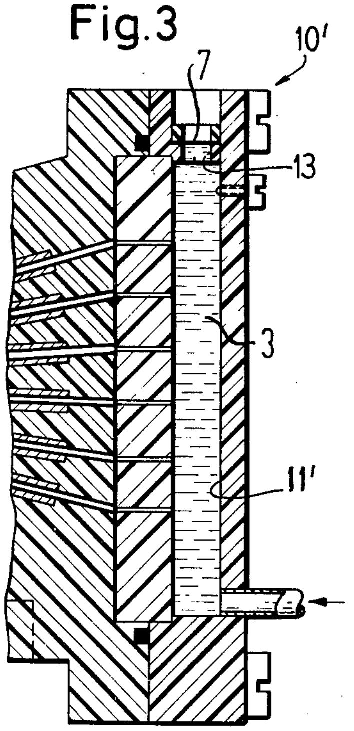
FIG. 3 is a partial cross section similar to FIG. 1 of an embodiment of the improved ink supply device.

An embodiment of the device is generally indicated at 10' and illustrated in FIG. 3. In this embodiment, the flexible wall member is an elastic diaphragm 7 which closes an opening 13 which is located in the neighborhood of the highest point of the distributor unit 3. Thus, one side of the diaphragm 7 is in contact with the ink in the cavity 11' and the other side is in contact with atmospheric pressure. This diaphragm 7 has the same characteristics as the silicon hose 5 of the embodiment of FIG. 1.

By using either of the embodiments of the invention, hydraulic vibrations or pressure fluctuations, which are produced within the ink supply as a consequence of shock loading, can be advantageously dampened. The dampening device, which comprises either the diaphragms 7 or the elastic tube 5, operates irrespective of temperature changes, the chemical nature of the printing liquid or ink, and the pressure of the surrounding atmosphere.

Although various minor modifications may be suggested by those versed in the art, it should be understood that we wish to employ within the scope of the patent warranted hereon, all such modifications as reasonably and properly come within the scope of our contribution of the art.

We claim:

1. In a device for supplying ink to a mosaic printer unit having several printing ink jets provided in a printer head, said device having a common distributor unit to supply ink to each of the printing ink jets, the improvement comprising the common distributor unit being attached to the printer head and having a cavity being filled with the printing ink, and said cavity supplying ink directly to each of said printing ink jets and being provided with an elastic wall member comprising a hose extending into the cavity with an interior surface of the hose being in communication with the atmosphere surrounding the device and an outer surface of the hose in contact with the ink in the cavity, so that hydraulic pressure fluctuation in the ink present in the cavity due to mechanical loading of the printer head and the attached distributor unit during a printing operation are dampened by movement of the elastic wall member.

* * * * *